A. B. SHAW,

Assignor to M. W. CARR & H. W. BROOKS.

Fastening Device or Clasp for Supporting Stockings.

No. 8,622. Reissued Mar. 11, 1879.

*Witnesses:*

Chas. Nida

H. L. Mattmburg

*Inventor:*

A. B. Shaw per [illegible]

Atty

N. PETERS, PHOTO-LITHOGRAPHER, WASHINGTON, D. C.

UNITED STATES PATENT OFFICE.

AI B. SHAW, OF MEDFORD, MASSACHUSETTS, ASSIGNOR TO MARTIN W. CARR AND HIRAM W. BROOKS.

IMPROVEMENT IN FASTENING DEVICES OR CLASPS FOR SUPPORTING STOCKINGS.

Specification forming part of Letters Patent No. 141,729, dated August 12, 1873; reissue No. 7,141, dated May 30, 1876; Reissue No. 8,622, dated March 11, 1879; application filed January 29, 1879.

*To all whom it may concern:*

Be it known that I, AI B. SHAW, of Medford, in the county of Middlesex and State of Massachusetts, have invented a new and useful Improvement in Fastening Devices or Clasps for Supporting Stockings; and that the following is a full, clear, and exact description of the same, reference being had to the accompanying drawings, and to the letters of reference marked thereon, making part of this specification.

This invention is in the nature of an improvement in clasps for supporting stockings and other garments; and the invention consists in a clasp for supporting stockings, &c., constructed with a frame having an opening therein enlarged at its upper part, to permit the passage of the fabric, and contracted at its lower end, in combination with a device adapted to be covered by the fabric of the stocking, &c., after the fabric has been passed through the upper enlarged portions of the opening of the frame, and to engage with said fabric and prevent its return through the lower contracted neck portion of the opening of the frame, the stocking, &c., being held to the clasp securely by the juxtaposition and co-operation of the said engaging device with the contracted opening of the frame. This clasp is particularly intended for use in attaching and fastening ladies' stocking-supporters to the upper portions of the stockings; but it may be used in any other connection, or for any other purpose for which it is adapted, as a mode or instrument of attachment.

Figure 1:
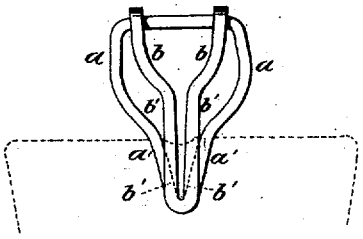
Figure 2:
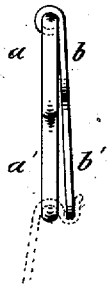

In the accompanying drawings, Figure 1 is a front elevation of my clasp, (a broken line showing a stocking or piece of cloth to which it is fastened;) and Fig. 2 is a side elevation of the same, (the broken lines showing a section of a stocking in the same position as shown in Fig. 1.)

Similar letters of reference indicate like parts in both figures.

*a* is the frame of the clasp, bent into the shape shown at *a'*. *b* is the engaging device, spreading at its upper portion, and bent at its lower portion, *b'*, into parallel, or nearly parallel, bars. The lower ends, *a'* and *b'*, extend to about the same length, and are both somewhat blunt, so as to avoid tearing, or in any manner injuring, the fabric to which it is attached.

The method of attaching the clasp to the top of a stocking which is illustrated in Figs. 1 and 2 is simply and quickly performed. The fastening is laid upon the edge of the fabric, and the stocking-edge is drawn through the frame *a* and placed over the end *b'* of the device *b*. The harder the stocking is pulled the more tightly it is held in the clasp. The fabric will tear before it can be got away, so well does the clasp grasp the stocking; hence the engaging device *b'* is made blunt at the point.

The portion of the frame designated by the letter *a'* is bent or contracted, so as to nearly conform to the shape of the engaging device *b'*, in order to produce more friction and to hold the fabric more steadily and tightly.

The top of the stocking may be attached to the clasp by merely crowding it into the part *b'* of the device, or in any other practicable manner.

As will be readily seen, this fastening device is very simple, inexpensive, and not liable to break, while it performs the office for which it is constructed perfectly.

Having now described my invention, what I claim as new, and desire to secure by Letters Patent, is—

1. A stocking-supporter clasp having a frame with an opening enlarged at its upper portion, and with a contracted neck or lower portion, to permit the fabric of the stocking to pass through the upper enlarged portion of the opening of the frame and to cover the engaging device, whereby the fabric is prevented from being drawn through the lower contracted neck of the opening of the frame, where the said lower contracted neck and the engaging device co-operate to hold the garment securely.

2. In a stocking-supporter clasp, a frame with an opening enlarged at its upper portion, and with a contracted neck or lower portion, combined with a device hinged to the frame, to engage with and prevent the garment from being drawn through the contracted neck or lower portion of the opening of the frame, where the said lower contracted neck and the engaging device co-operate to hold the garment securely.

3. In a stocking-supporter clasp, the bent frame *a a'* and the blunt engaging device *b b'*, constructed and arranged substantially as and for the purpose hereinbefore set forth.

4. In a stocking-supporter clasp, the engaging device *b b'*, terminating in ends adapted to be attached to a bar or other support, all substantially as and for the purpose described.

AI B. SHAW.

Witnesses:
R. A. FILLEBROWN,
G. WASHINGTON WARREN.